United States Patent [19]

Gupta et al.

[11] 4,061,996
[45] Dec. 6, 1977

[54] STATUS MONITORING APPARATUS FOR BLC SYSTEMS

[75] Inventors: Alankar Gupta, Renton, Wash.; Delmar M. Fadden, Hampton, Va.

[73] Assignee: The Boeing Company, Seattle, Wash.

[21] Appl. No.: 626,049

[22] Filed: Oct. 28, 1975

[51] Int. Cl.$^2$ .................................................. G08B 29/00
[52] U.S. Cl. ..................................... 340/27 R; 244/201; 340/27 SS
[58] Field of Search ...................... 340/27 R, 27 SS; 244/42 C, 42 CC; 73/116, 117.3, 407 PR; 235/150.2, 150.22

[56] References Cited

U.S. PATENT DOCUMENTS

| | | | |
|---|---|---|---|
| 2,738,490 | 3/1956 | Mihalakis | 340/27 R |
| 2,925,710 | 2/1960 | Gavin | 73/407 PR |
| 2,981,058 | 4/1961 | Reed | 73/116 |
| 2,986,929 | 6/1961 | Reed | 73/116 |
| 3,108,183 | 10/1963 | Ganley et al. | 235/150.2 |
| 3,136,155 | 6/1964 | Richter et al. | 340/27 R |
| 3,164,821 | 1/1965 | Broder et al. | 340/27 R |
| 3,238,768 | 3/1966 | Richardson | 235/150.2 |
| 3,287,965 | 11/1966 | Brahm et al. | 235/150.2 |
| 3,300,785 | 1/1967 | Richardson et al. | 73/117.3 |
| 3,357,239 | 12/1967 | Hohenberg | 235/150.2 |
| 3,485,093 | 12/1969 | Muller et al. | 235/150.2 |
| 3,538,760 | 11/1970 | Atkey et al. | 73/117.3 |
| 3,697,731 | 10/1972 | Kempema | 235/150.2 |
| 3,817,099 | 6/1974 | Bubniak et al. | 73/117.3 |

*Primary Examiner*—John W. Caldwell
*Assistant Examiner*—James J. Groody
*Attorney, Agent, or Firm*—Christensen, O'Connor, Garrison & Havelka

[57] ABSTRACT

Apparatus for monitoring the operational status of the air delivery and momentum injection subsystems of a Boundary Layer Control (BLC) system of an aircraft, by sensing an air flow parameter in the supply duct supplying air to the BLC manifold is disclosed. The air flow parameter is sensed as a ratio of two discreet pressures [stagnation/static ($P_T/P_S$) or static/static ($P_{S1}/P_{S2}$)]. When the ratio falls outside of a predetermined range, an indication that the air delivery and momentum injection subsystem has failed is provided. The failure may be due to either a rupture or a blockage of the air delivery and momentum injection subsystem. A combined BLC status indication is provided by combining the signal related to the sensed air flow parameter with signals related to the correctness of the position of the valves controlling the bleed air flowing to the air delivery momentum and injection subsystem and the position of the high lift surfaces (e.g., flaps) of the aircraft.

6 Claims, 4 Drawing Figures

STATUS MONITORING APPARATUS FOR BLC SYSTEMS

BACKGROUND OF THE INVENTION

This invention is directed to status monitoring and more particularly to the operational status monitoring of the BLC system of an aircraft.

Short takeoff and landing (STOL) airplane, utilizing boundary layer control (BLC) for high lift, directly depend on BLC system performance for stall margin and lateral controllability. This dependency demands that the system have adequate failure detection and warning devices, and a reliable BLC status monitoring system for personnel and airplane safety. The former, is necessary for airplane primary structure protection since, BLC systems are generally designed to operate on direct engine bleed, with associated high pressures and temperatures, due to installation space limitations. The latter is essential to meet the basic BLC system design condition dictated by engine-out performance requirements, namely, the maintaining of adequate stall margin while still achieving acceptable climb gradient for go-around or acceptable descent angle for landing after an engine failure. To meet this latter condition, it is imperative that BLC system status be continuously monitored and the crew be warned of system malfunction prior to aircraft high-lift performance deterioration.

Past attempts to detect failures and monitor the operation status of BLC systems have been based on deductive logic, i.e., system status was deduced from the position of control valves and high lift surfaces. The basic assumption made was as follows: if the valves and high lift surfaces are in the required position during the time all engines are operating, the system has no failures and maintains the capability to deliver design blowing momentum, in the designed distribution pattern, in the event of an engine failure. This simple approach does not provide the positive indication of capability required by flight safety considerations because it does not provide a check for ducting or nozzle failures such as rupture or blockage due to component failure, material fatigue or hostile action. These failures if undetected can cause: (a) a significant reduction in low speed maneuver capability and operational safety margins, in the event of an engine failure, due to loss of blowing momentum and/or distortion of momentum distribution (premature "stall" of some lifting surfaces); (b) a loss of engine thrust and possibly engine damage due to extraction of engine bleed beyond allowable engine bleed limits; and/or (c) damage to airplane primary structure, control cables, sense lines, electrical wiring and other vital equipment, in close proximity to the ducting, by exposure to high temperature air.

It is an object of this invention to provide a new and improved status monitoring apparatus for boundary layer control systems.

It is a further object of this invention to provide a BLC system status monitoring apparatus that monitors the operation of the air delivery and momentum injection subsystems of the BLC system.

It is a still further object of this invention to provide a BLC system status monitoring apparatus adapted to detect a rupture or blockage of the air delivery and momentum injection subsystems of the BLC system.

SUMMARY OF THE INVENTION

In accordance with principles of this invention, the air flow of a BLC system is monitored to detect failures of the air delivery and momentum injection subsystem of the BLC system. Monitoring is accomplished by sensing the supply duct flow parameter, a function of duct Mach number. In one form, the inlet duct flow parameter is sensed by sensing the stagnation/static ($P_T/P_S$) pressure ratio of the supply air, i.e., the air flowing toward the air delivery and momentum injection subsystems. In another form, the inlet duct flow parameter is sensed by sensing a static/static ($P_{S1}/P_{S2}$) pressure ratio (taken at different cross-sectional locations) of the incoming air. Regardless of how the inlet flow parameter is sensed, the end result is the production of a signal related to the total exhaust area downstream of the sense location.

In accordance with further principles of this invention, the supply duct flow parameter is sensed by pressure sensing transducers, each of which generates an electrical output signal related to the sensed condition. The pressure transducer output signals are processed and an electrical signal proportional to the ratio of sensed pressure is generated. This output "ratio" signal is ANDed with signals from the position transducers of the high lift surfaces (flaps) of the aircraft and the position transducers of the bleed valves of the BLC system. If any one of these sources of information indicates a failure or malfunction, the AND gate performing the AND function generates an output signal which operates a 'BLC System Failure Indicator.'

It will be appreciated from the foregoing description that the invention provides an apparatus for overcoming the above noted disadvantages of the prior art of BLC system status monitoring by including a check of system structural integrity.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

As briefly discussed above, the design of boundary layer control (BLC) systems for high lift STOL aircraft is generally dictated by engine-out performance requirements. More specifically, the design of boundary layer control systems is generally based on the requirement that such aircraft maintain adequate stall or maneuver margin and still achieve an acceptable climb gradient for go-around or descent angle for landing after an engine failure. Such system design requirements make it imperative that the operational status of the BLC system be continuously monitored and that the crew of the aircraft be forewarned of system malfunction prior to system performance deterioration. This is important from a flight safety point of view. More specifically, BLC system monitoring is important because BLC systems on high lift STOL aircraft significantly alter the low speed maneuver capability and stall margin of the aircraft.

The present invention provides an apparatus for monitoring the operational status of BLC systems, particularly those based on the concept of "blowing" and operating at nozzle pressure ratios greater than critical, 1.89. The invention provides a positive method of indicating to the flight crew the availability of adequate engine-out BLC blowing momentum (hence, maneuver margin) during all engine system operation.

The present invention accomplishes the foregoing result by sensing a supply duct flow parameter as a function of a pressure ratio, and utilizing the sensed information, in combination with other information related to bleed valve position and flap position.

Figure 1:
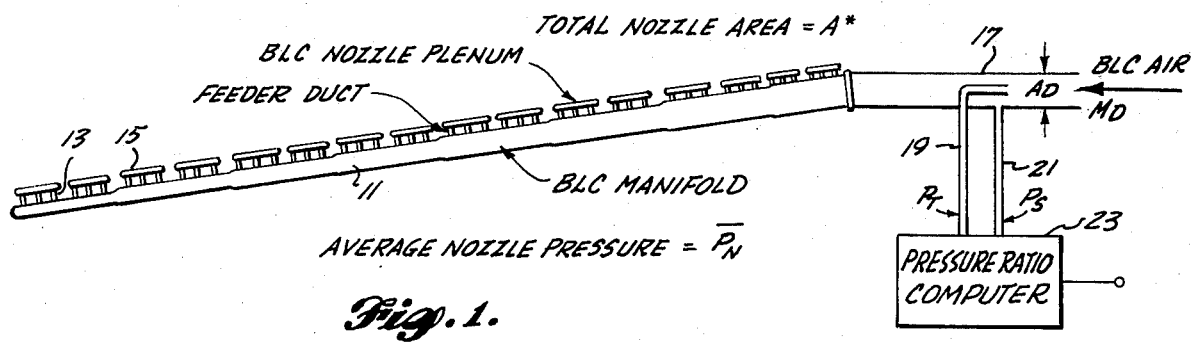
FIG. 1 is a diagram illustrating one form of a BLC air delivery and momentum injection subsystem with pressure probes shown in accordance with the invention.

FIG. 1 illustrates, schematically, the air delivery and momentum injection subsystem of a BLC system for the leading edge of a wing of a STOL aircraft. The air delivery subsystem includes a BLC manifold 11 extending outwardly along the leading edge of the wing and a plurality of feeder ducts 13 connecting the BLC manifold to a plurality of BLC nozzle plenums 15, which form the momentum injection subsystems. Located at the inlet of the BLC manifold is a supply duct flow parameter sensor 17 comprising a stagnation pressure tube 19 and a static pressure tube 21. The stagnation pressure tube 19 and the static pressure tube 21 are connected to a pressure ratio computer 23 that generates an electrical signal proportional to the ratio of sensed pressures.

In a "blowing" type BLC system designed to operate above critical pressure ratio, and having an installed effective momentum injection subsystem nozzle of area $A^*$ downstream of a supply duct with a flow area of $A_D$, the flow passing through the system is given by the following isentropic flow equations: Through the blowing nozzles of the momentum injection subsystem (sonic flow)

$$W = \sqrt{\frac{\gamma g}{R}} \cdot \left(\frac{2}{\gamma + 1}\right)^{\frac{\gamma+1}{2(\gamma-1)}} \cdot \frac{\bar{P}_N}{\sqrt{T}} \cdot A^* \quad (1)$$

Through the supply duct of the air delivery subsystem (subsonic flow)

$$W = \sqrt{\frac{\gamma g}{R}} \cdot \frac{M_D}{\left(1 + \frac{\gamma-1}{2} M_D^2\right)^{\frac{\gamma+1}{2(\gamma-1)}}} \cdot \frac{P_T}{\sqrt{T}} \cdot A_D \quad (2)$$

where:
 $W$ = flow rate, lb/sec
 $\gamma$ = ratio of specific heats
 $g$ = acceleration due to gravity, ft/sec$^2$
 $R$ = gas constant, ft-lb/lb°R
 $T$ = gas stagnation temperature, °R
 $\bar{P}_N$ = average nozzle stagnation pressure, psia
 $P_T$ = duct stagnation pressure, psia
 $A^*$ = effective blowing nozzle area downstream of delivery duct, in$^2$
 $A_D$ = delivery duct effective flow area, in$^2$
 $M_D$ = delivery duct local flow Mach number The above equations can be simplified to yield:

$$\frac{1}{M_D}\left[\left(\frac{2}{\gamma+1}\right)\left(1 + \frac{\gamma-1}{2} M_D^2\right)\right]^{\frac{\gamma+1}{2(\gamma-1)}} \cdot \frac{\bar{P}_N}{P_T} = \frac{A_D}{A^*} \quad (3)$$

Noting that $$\bar{P}_N = P_T - \Delta P$$

where $\Delta P$ = average system pressure loss (psi) and $$\Delta P/P_T = \text{a constant } C_1 \text{ (a function of system design)} \quad (5)$$

for a system operating above the critical pressure ratio, Equation (3) reduces to:

$$\frac{1}{M_D}\left[\left(\frac{2}{\gamma+1}\right)\left(1 + \frac{\gamma-1}{2} M_D^2\right)\right]^{\frac{\gamma+1}{2(\gamma-1)}} = \left(\frac{A_D}{A^*}\right)\left(\frac{1}{1-C_1}\right) \quad (6)$$

For a typical BLC system, where the delivery system is subsonic and the nozzles are sonic, the above equation yields an unique value of $M_D$ for a fixed value of $A_D/A^*$ and $C_1$, i.e., $$M_D = \phi_1\left(\frac{A_D}{A^*}, C_1\right) \quad (7)$$

From isentropic flow relations, it is known that the duct flow Mach number, $M_D$, is a function of the local stagnation and static pressures, $P_T$ and $P_S$, respectively, sensed by the stagnation and static pressure tubes 19 and 21; i.e., $$M_D = \sqrt{\left[\left(\frac{P_T}{P_S}\right)^{\frac{\gamma-1}{\gamma}} - 1\right]\left(\frac{2}{\gamma-1}\right)} \quad (8)$$

or $$M_D = \phi_2\left(\frac{P_T}{P_S}\right).$$

Hence from Equations (7) and (8), it can be deduced that $$P_T/P_S = \phi_3(A_D/A^*, C_1) \quad (9)$$

Figure 3:
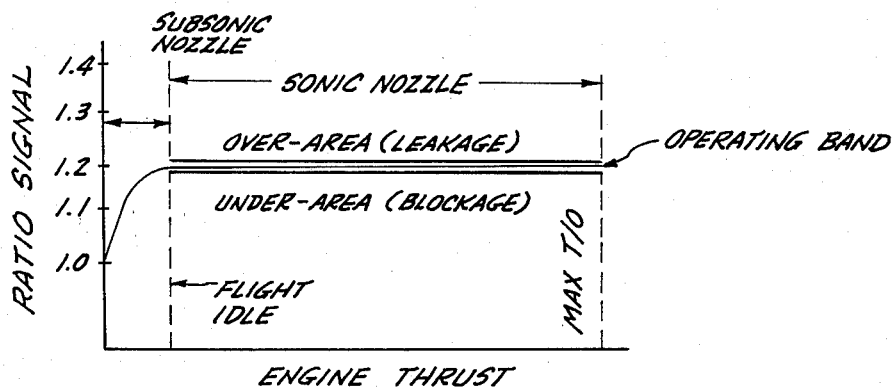
FIG. 3 is a graph illustrating certain aspects of the invention.

In other words, the ratio of $P_T$ to $P_S$ is a measurement of an inlet flow parameter (Mach number) indicative of the exhaust area downstream of sense location. If this ratio falls within the operating band (FIG. 3) for thrusts above a known thrust value, the BLC system is operating satisfactorily. Contrawise, as the ratio increases and passes out of the operating band in one direction, an over-area or leakage condition is indicated. On the other hand, as the ratio decreases and passes out of the operating band in the other direction, an under-area or blockage condition is indicated. It will be appreciated that the operating band can be narrow or wide, as determined by the operational limits placed on the aircraft.

Figure 2:
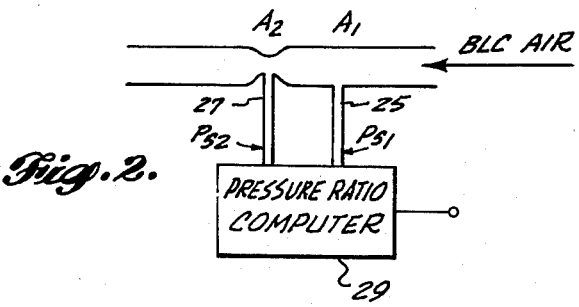
FIG. 2 is a diagram illustrating an alternate form of a BLC air delivery and momentum injection subsystem with pressure probes shown in accordance with the invention.

FIG. 2 illustrates an alternative air delivery and injection momentum monitor wherein the inlet flow parameter is sensed by sensing two inlet static pressures, at different cross-sectional locations. The first static pressure, $P_{S1}$, is obtained at a first location having a cross-sectional area $A_1$ and the second static pressure, $P_{S2}$, is obtained at a second location having a cross-sectional area $A_2$, with $A_1 > A_2$. The ratio of $P_{S1}$ to $P_{S2}$ is, essentially, equivalent to the ratio of $P_T$ to $P_S$ and, thus, the graphical relationship for this monitor is essentially the same as that illustrated in FIG. 3 for the FIG. 1 monitor. The static tubes 25 and 27 sensing $P_{S1}$ and $P_{S2}$, respectively, are connected to a pressure ratio computer 29 that generates an electrical output indicative of the ratio $P_{S1}/P_{S2}$.

Figure 4:
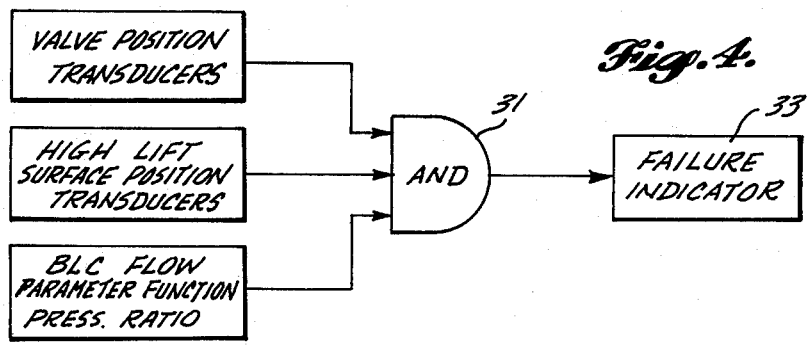
FIG. 4 is a block diagram illustrating a BLC system status monitor and failure indicator formed in accordance with the invention.

Regardless of the nature of the air delivery and momentum injection monitor, the flow parameter information is combined with information related to: (1) the position of the bleed valves controlling bleed air flowing to the BLC manifold from the engines; and (2) the position of the high lift surfaces of the aircraft. This position information is obtained from suitable position transducers mounted so as to sense the position of the related components and adapted to generate electrical signals related to such positions. Electrical signals related to the correctness of each of the relevant subsystems for the chosen aircraft control position are combined in an AND gate 31, as illustrated in FIG. 4. The output of the AND gate is applied to a failure indicator such that, if any of the various parameters fall outside of operational limits, or indicate that their related component is incorrectly positioned, the failure indicator 33 indicates a failure of the BLC system of the aircraft.

It will be appreciated from the foregoing description that the invention provides a status monitoring apparatus for BLC systems. The invention not only monitors the positions of engine bleed valves and the high lift surfaces of the aircraft, it also monitors the air delivery and momentum injection subsystems of the boundary layer control system. Thus, a failure of the air delivery and momentum injection subsystems, for any reason, will provide a failure indication. Such indication will warn the crew of the aircraft, during the time all engines are operative, that should an engine out-condition occur, the aircraft will not have available the designated maneuver margin. This forewarning is extremely important for this will prevent the crew from attempting operations that may be critical for personnel and/or airplane safety.

While preferred embodiments of the invention have been illustrated and described, it will be appreciated by those skilled in the art and others that various changes can be made therein without departing from the spirit and scope of the invention. Hence, the invention can be practiced otherwise than as specifically described herein.

The embodiments of the invention in which an exclusive property or privilege is claimed are defined as follows:

1. In an aircraft Boundary Layer Control (BLC) system wherein engine bleed air is ducted to an air delivery and momentum injection subsystem including a BLC manifold for receiving said engine bleed air and BLC nozzle plenums connected to the manifold for directing the bleed air from the manifold to predetermined regions of a wing of the aircraft, the improvement comprising:
   monitoring means for monitoring the flow of engine bleed air to said BLC manifold to detect failures in said air delivery and momentum injection subsystem of said BLC system, said monitoring means monitoring an air flow parameter of the bleed air at the air inlet of said BLC manifold.

2. The improvement claimed in claim 1 wherein said air flow parameter is determined from the inlet stagnation/static pressure ratio.

3. The improvement claimed in claim 1 wherein said air flow parameter is determined from the ratio of two inlet static pressures, the two static pressures being sensed at different cross-sectional areas of the inlet to the air delivery and momentum injection subsystem.

4. The improvement claimed in claim 1 wherein said monitoring means generates an electrical output signal whose status is representative of the state of the air delivery and momentum injection subsystem being monitored.

5. The improvement claimed in claim 4 wherein said air flow parameter is determined from the inlet stagnation/static pressure ratio.

6. The improvement claimed in claim 5 wherein said air flow parameter is determined from the ratio of two inlet static pressures, the two static pressures being sensed at different cross-sectional areas of the inlet to the air delivery and momentum injection subsystem.

* * * * *